US010545578B2

United States Patent
Britto Mattos Lima et al.

(10) Patent No.: US 10,545,578 B2
(45) Date of Patent: Jan. 28, 2020

(54) RECOMMENDING ACTIVITY SENSOR USAGE BY IMAGE PROCESSING

(71) Applicant: International Business Machines Corporation, Armonk, NY (US)

(72) Inventors: Andrea Britto Mattos Lima, Rio de Janeiro (BR); Priscilla Barreira Avegliano, Rio de Janeiro (BR); Vagner Figueredo de Santana, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 15/852,414

(22) Filed: Dec. 22, 2017

(65) Prior Publication Data

US 2019/0196598 A1   Jun. 27, 2019

(51) Int. Cl.
*G06F 3/01* (2006.01)
*G06K 9/00* (2006.01)
*G06T 7/20* (2017.01)
*G06F 3/00* (2006.01)

(52) U.S. Cl.
CPC .............. *G06F 3/017* (2013.01); *G06F 3/005* (2013.01); *G06F 3/011* (2013.01); *G06K 9/00711* (2013.01); *G06T 7/20* (2013.01)

(58) Field of Classification Search
CPC .......... G06F 3/017; G06F 3/005; G06F 3/011; G06K 9/00711; G06T 7/20
See application file for complete search history.

(56) References Cited

U.S. PATENT DOCUMENTS

| | | | |
|---|---|---|---|
| 7,421,369 B2 | 9/2008 | Clarkson | |
| 8,371,989 B2 | 2/2013 | Kim et al. | |
| 9,278,255 B2 | 3/2016 | Cheng et al. | |
| 9,380,855 B2 | 7/2016 | Anderson | |
| 9,545,221 B2 | 1/2017 | Adhikari et al. | |
| 9,773,330 B1* | 9/2017 | Douglas | A43B 3/0005 |
| 10,154,695 B2* | 12/2018 | Jin | A61B 5/1117 |
| 2006/0025282 A1 | 2/2006 | Redmann | |
| 2006/0100910 A1 | 5/2006 | Brown et al. | |
| 2007/0270721 A1 | 11/2007 | Ananny et al. | |

(Continued)

FOREIGN PATENT DOCUMENTS

WO   2009090584 A2   7/2009
WO   2009152608 A1   12/2009

*Primary Examiner* — David F Dunphy
(74) *Attorney, Agent, or Firm* — Ryan, Mason & Lewis, LLP

(57) ABSTRACT

Methods, systems, and computer program products for recommending activity sensor usage by image processing are provided herein. A computer-implemented method includes identifying, based on (i) sensor data from one or more sensors during a user activity and (ii) video data associated with the user performing the user activity, positioning of the one or more sensors with respect to the user; identifying the user activity being performed based on the video data; assessing data quality for the sensor data based on (i) the identified positioning of the one or more sensors and (ii) the identified user activity; and generating a recommendation for re-positioning at least one of the one or more sensors based on (i) the assessing and (ii) historical data pertaining to sensor data associated with the identified user activity.

20 Claims, 6 Drawing Sheets

(56) References Cited

U.S. PATENT DOCUMENTS

| | | | |
|---|---|---|---|
| 2009/0259148 A1* | 10/2009 | Willmann | A61B 5/1071 600/595 |
| 2010/0022351 A1* | 1/2010 | Lanfermann | A61B 5/1114 482/1 |
| 2011/0054870 A1 | 3/2011 | Dariush et al. | |
| 2011/0305369 A1* | 12/2011 | Bentley | G06K 9/00342 382/103 |
| 2012/0116550 A1 | 5/2012 | Hoffman et al. | |
| 2012/0188158 A1* | 7/2012 | Tan | A61B 5/0488 345/156 |
| 2012/0212505 A1 | 8/2012 | Burroughs et al. | |
| 2012/0239173 A1 | 9/2012 | Laikari et al. | |
| 2012/0259651 A1 | 10/2012 | Mallon et al. | |
| 2012/0323346 A1 | 12/2012 | Ashby et al. | |
| 2014/0350359 A1* | 11/2014 | Tankiewicz | A61B 5/0002 600/301 |
| 2015/0088547 A1 | 3/2015 | Balram et al. | |
| 2015/0289820 A1* | 10/2015 | Miller | A61B 5/7221 600/300 |
| 2016/0135695 A1* | 5/2016 | Cobbett | A61B 5/0205 600/301 |
| 2016/0163224 A1 | 6/2016 | Rauhala et al. | |
| 2016/0210839 A1 | 7/2016 | Yadav et al. | |
| 2016/0283887 A1 | 9/2016 | Jagyasi et al. | |
| 2016/0367857 A1* | 12/2016 | Aragones | G06F 19/3481 |
| 2017/0014049 A1* | 1/2017 | Dumanyan | A61B 5/112 |
| 2017/0026608 A1 | 1/2017 | Lokshin | |
| 2017/0262056 A1* | 9/2017 | Osman | G06F 3/014 |
| 2018/0000367 A1* | 1/2018 | Longinotti-Buitoni | A41D 13/1281 |
| 2018/0184920 A1* | 7/2018 | Rabinovich | A61B 5/746 |
| 2018/0188284 A1* | 7/2018 | Douglas | G01P 3/00 |
| 2018/0260032 A1* | 9/2018 | Norieda | G06T 7/11 |
| 2018/0263510 A1* | 9/2018 | Cronin | A61B 5/0002 |
| 2019/0035210 A1 | 1/2019 | Bulzacki et al. | |
| 2019/0038187 A1* | 2/2019 | Latella, Jr. | A61B 5/1128 |
| 2019/0080417 A1 | 3/2019 | Amigo et al. | |

* cited by examiner

RECOMMENDING ACTIVITY SENSOR USAGE BY IMAGE PROCESSING

FIELD

The present application generally relates to information technology, and, more particularly, to sensor management.

BACKGROUND

A growing number of individuals use activity sensors, for example, to obtain information pertaining to their daily physical activity and performance. Activity sensors commonly capture data from user movements, provided by components such as accelerometers, gyroscopes, etc. Additionally, models can be used to correlate the captured data to a predefined set of movements. However, challenges existing using current approaches due to a lack of training examples and improper positioning of such sensors, which limits the ability to capture meaningful information about the user movements.

SUMMARY

In one embodiment of the present invention, techniques for recommending activity sensor usage by image processing are provided. An exemplary computer-implemented method can include steps of identifying, based on (i) sensor data from one or more sensors during a user activity and (ii) video data associated with the user performing the user activity, positioning of the one or more sensors with respect to the user, wherein the one or more sensors are at least one of (a) positioned within a given proximity of a user and (b) worn by the user; identifying the user activity being performed based on the video data; assessing data quality for the sensor data based on (i) the identified positioning of the one or more sensors and (ii) the identified user activity; and generating a recommendation for re-positioning at least one of the one or more sensors based on (i) the assessing and (ii) historical data pertaining to sensor data associated with the identified user activity.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes recommending activity sensor usage by image processing. At least one embodiment of the invention includes utilizing sensor information and camera information during a physical activity to increase the accuracy in recognizing the movements being made/performed by the user (wearing the sensor(s)) during the activity, and generating a recommendation for the best use and/or placement of the sensor(s).

One or more embodiments, as further detailed herein, includes increasing sensor data capturing accuracy during a physical (user) activity by using video data obtained from an external camera. The video information is processed automatically using one or more computer vision algorithms capable of informing the system (server) what activity is being performed (by the user), and enabling such information to be added and/or incorporated into the machine learning algorithm of the sensors responsible for estimating motion-related information. The one or more computer vision algorithms are additionally capable of analyzing the execution of the movement of the user during the activity in question, to suggest one or more (improved) positioning of the sensor(s), so as to extract (additional) information during the data capturing phase of the sensor(s) execution. Also, in at least one embodiment of the invention, the one or more computer vision algorithms are capable of estimating, using the visual information derived from the camera, the movements being performed by the user, so as to increase the confidence of the sensor(s) when detecting the same movement in the future. Additionally, the sensors can be used as visual markers to assist in one or more video processing algorithms. In such an embodiment, the video information can enhance sensor analysis as well as computer vision algorithms.

As also detailed herein, at least one embodiment of the invention can include implementing computer vision techniques to improve and/or enhance identification of physical activities by allowing inclusion of new/additional recognized movements to a knowledge base, and suggesting specific positioning of sensors for improved recognition of activities.

Figure 1:
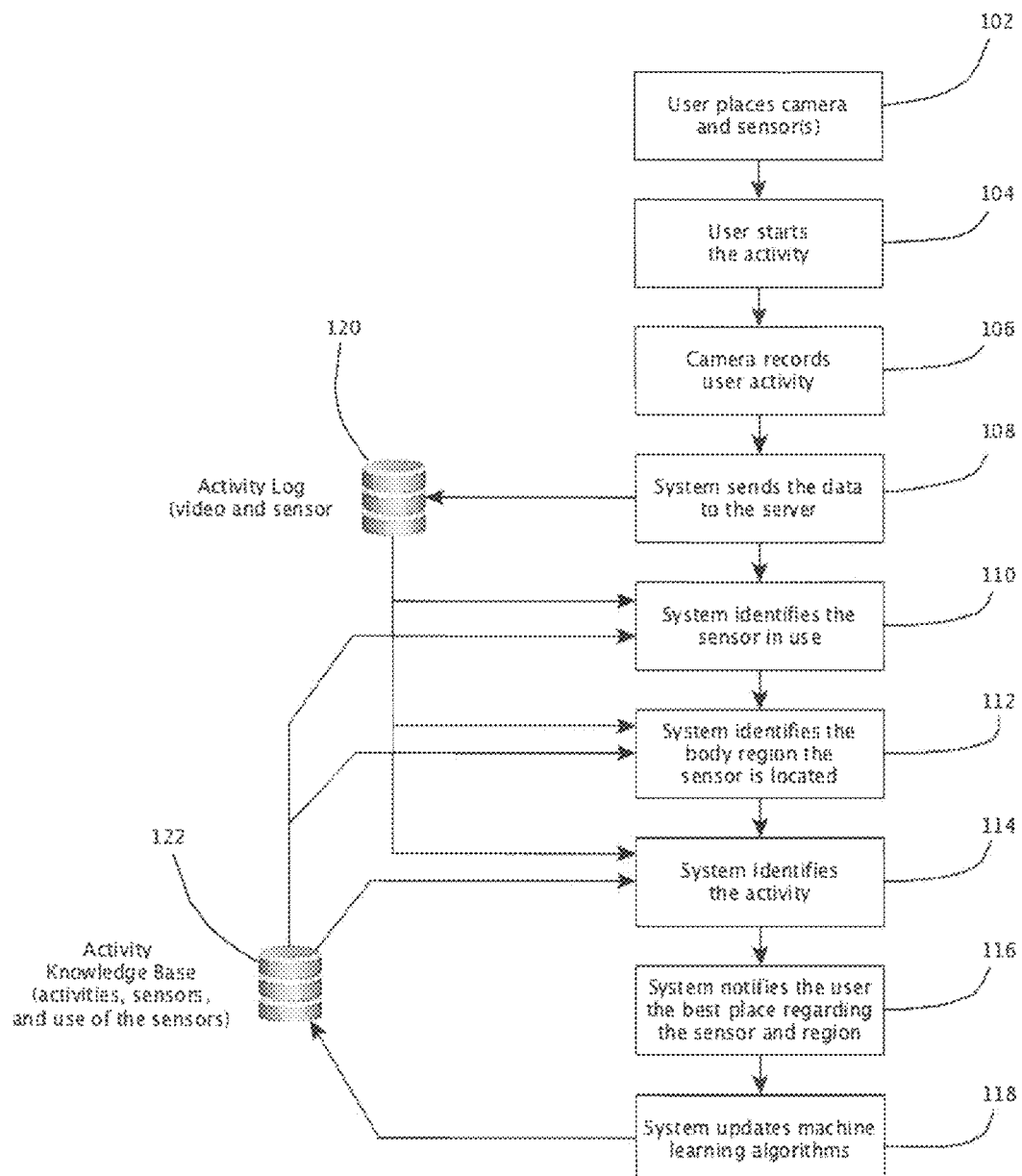
FIG. 1 is a flow diagram illustrating techniques for recommending activity sensor usage, according to an exemplary embodiment of the invention.

FIG. 1 is a flow diagram illustrating techniques for recommending activity sensor usage, according to an exemplary embodiment of the invention. In step 102, the user places one or more sensors (for example, a smart watch) on his or her body and additionally positions a camera (for example, a smart phone) at an appropriate location for capturing video data of the user. In step 104, once the sensor(s) and camera are in place, the user starts an activity (for example, exercise, functional training, etc.). In step 106, the data captured includes the data generated by the sensor(s) and captured by the camera. The recorded video serves as input to one or more computer vision algorithms.

Algorithms for motion estimation can include, but are not limited to, optical flow, template matching, and feature matching via random sample consensus (RANSAC). Algorithms for action recognition can include, but are not limited to, support vector machine- (SVM-) based classification of hard-coded features (such as histogram of oriented gradient (HOG) and histogram of optical flow (HOF)) and deep learning using convolutional neural networks (CNNs) and long short-term memories (LSTMs). In step 108, the camera and the sensor(s) send captured data to a client module that, in turn, sends the data to a server module 120 (that is, a back-end of the system). The server module 120 includes an activity log database that contains the data sent by the client modules, which includes sensor(s) data and video recorded. Additionally, in step 110, the system uses one or more computer vision algorithms to identify the one or more sensors in use. The visual appearance of the sensor itself serves as a point of reference; if the visual appearance is not discriminant enough, a fiducial marker may be added to the sensor.

In step 112, the system uses one or more computer vision algorithms to identify the one or more regions of the user's body that are equipped with a sensor, using the visual input from the sensor itself. Additionally, steps 110 and 112 can be performed on a client module itself in cases wherein there is computation power available at the client module. In step 114, the system classifies the current activity (of the user) based on information from an activity knowledge base 122 used to train one or more classification algorithms, and identifies the activity being performed (for example, running, practicing yoga, sleeping, etc.). The camera can use the sensor visual movements to assist in the identification of the activity.

In step 116, the identification output is sent to the client module, which notifies the user. If the sensor is located in a body region that is not optimal for measuring the activity being practiced, the user is informed, via the client module, and can re-position the sensor to a notified position. Additionally, a best practice can be suggested that involves ways to improve the sensor's data quality, aiming at richer analytics (for example, when practicing yoga, the important information to be taken into account can include the orientation of the gyroscopes, for positions in which a person stands still). Further, in step 118, the system updates the activity knowledge base 122. If the tuple (sensor(s), activity, and body region(s)) pertaining to the configuration the user was using prior to the recommendation is not in the database 122, the system creates a new class for the tuple. For existing tuples, the knowledge base 122 is enriched with the new data.

The activity knowledge base 122 includes a database containing all video image and sensor data used by the machine learning algorithms. Additionally, the activity knowledge base 122 can be created, for example, by applying computer vision algorithms to public videos of professionals teaching how to perform exercises, which might also contain textual information describing the activities or even sensors used in the videos. Such textual information can be used to label the activities, regions, and/or sensors used in the activities. The activity knowledge base 122 can also include information extracted from literature (for example, textbooks, research papers, etc.).

Figure 2:
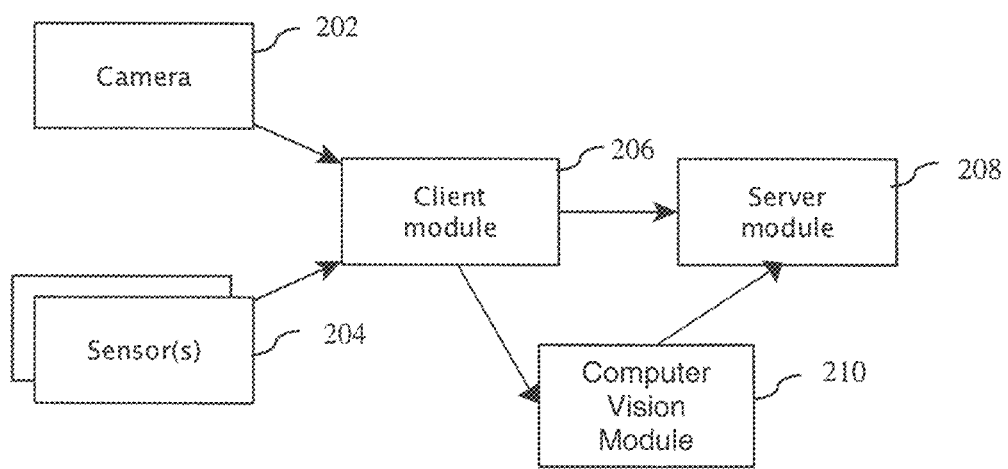
FIG. 2 is a diagram illustrating system architecture, according to an exemplary embodiment of the invention.

FIG. 2 is a diagram illustrating system architecture, according to an embodiment of the invention. By way of illustration, FIG. 2 depicts a camera 202, one or more sensors 204, a client module 206, a server module 208, and a computer vision module 210. The client module is responsible for communicating with the user (for example, informing user regarding the re-positioning of the one or more sensors 204). The server module 208 is responsible for hosting the computer vision module 210, which is a software component capable of running computer vision algorithms (that may, for example, have high computation cost at the server) for performing one or more steps detailed in FIG. 1 (such as, for example, step 114).

As described herein, one or more embodiments of the invention include techniques for increasing user-worn sensor 204 accuracy during a physical user activity by processing video input (from external camera 202) via the computer vision module 210. In at least one embodiment of the invention, the computer vision module 210 can determine and inform the server module 208 the activity being performed by the user. Additionally, the computer vision module 210 can analyze the execution of the user movement(s) to suggest a beneficial positioning of the sensor(s) 204. Further, the computer vision module 210 can estimate, using visual information derived from the camera 202, the one or more movements being performed by the user, so as to increase the confidence of the sensor 204 when detecting the same movement.

By way merely of illustrating one or more embodiments of the invention, consider the following use cases. In a first example use case involving home exercises, at least one embodiment of the invention can include allowing the activity sensor to discover successful characteristics of "new" movements to help identify such movements, and personalize the sensor activity to the user's needs and routine. In a second example use case involving physiotherapy, using enriched data obtained by combining sensor data and camera data, at least one embodiment of the invention can include accurately identifying the exercise being performed, providing one or more recommendations of how to optimize the set of sensors in use, given that physiotherapy movements require precise movements, and allowing such specialized support to scale. The recommendations offered by one or more embodiments of the invention can consider an activity knowledge base (such as component 122 in FIG. 1), trained with examples of correct movements (often supervised by specialists). Hence, such capabilities make it possible to scale-up recommendations involving activities requiring precise movements.

Figure 3:
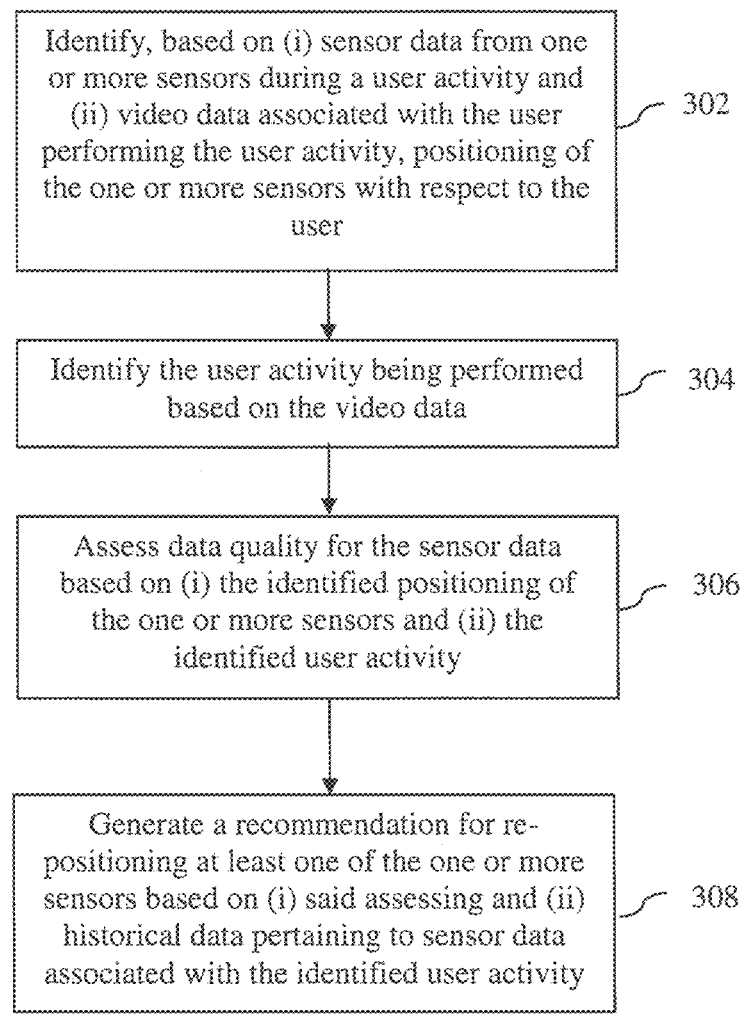
FIG. 3 is a flow diagram illustrating techniques according to an embodiment of the invention.

FIG. 3 is a flow diagram illustrating techniques according to an embodiment of the present invention. Step 302 includes identifying, based on (i) sensor data from one or more sensors during a user activity and (ii) video data associated with the user performing the user activity, positioning of the one or more sensors with respect to the user, wherein the one or more sensors are at least one of (a) positioned within a given proximity of a user and (b) worn by the user. Identifying positioning of the one or more sensors can include detecting a shape associated with the one or more sensors, a color associated with the one or more sensors, and/or a texture associated with the one or more sensors. Additionally, identifying positioning of the one or more sensors can include implementing a fiducial marker in connection with the one or more sensors.

Step 304 includes identifying the user activity being performed based on the video data. Identifying the user activity can include utilizing one or more human body models, statistically decomposing a human body into a hierarchical structure, and/or computing displacement information from an optical flow field. Additionally, identifying the user activity can include implementing an image classifier, generated based on training data, to determine one or more classes of user activities relevant to the sensor data and the video data. One or more embodiments of the invention can include using classifiers such as support vector machines (SVMs), random trees, (deep) convolutional neural networks, etc., and/or we face recognition-based approaches using local binary patterns (LBP), Haar cascades, etc.

Step 306 includes assessing data quality for the sensor data based on (i) the identified positioning of the one or more sensors and (ii) the identified user activity. Assessing can include determining a noise-to-signal ratio for the sensor data, and/or utilizing a look-up a table containing pre-defined tuples associated with user activities.

Step 308 includes generating a recommendation for re-positioning at least one of the one or more sensors based on (i) said assessing and (ii) historical data pertaining to sensor data associated with the identified user activity. The recommendation can include combining two or more of the sensors, and/or a recommendation of one or more additional user activities.

The techniques depicted in FIG. 3 can also include outputting, to the user, a notification containing the recommendation for re-positioning at least one of the one or more sensors. Further, the techniques depicted in FIG. 3 can also include updating, based on the recommendation, one or more machine learning algorithms of the one or more sensors, wherein the one or more machine learning algorithms are responsible for estimating motion-related information. Additionally, at least one embodiment of the invention can include storing the sensor data, the video data, the identified positioning of the one or more sensors, the identified user activity, and the recommendation in a knowledge base. Further, one or more embodiments of the invention can include determining positioning of at least one camera associated with capturing video data, wherein determining the positioning of at least one camera can include inferring a camera view with respect to the user, and utilizing a look-up table containing pre-defined tuples associated with camera views.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
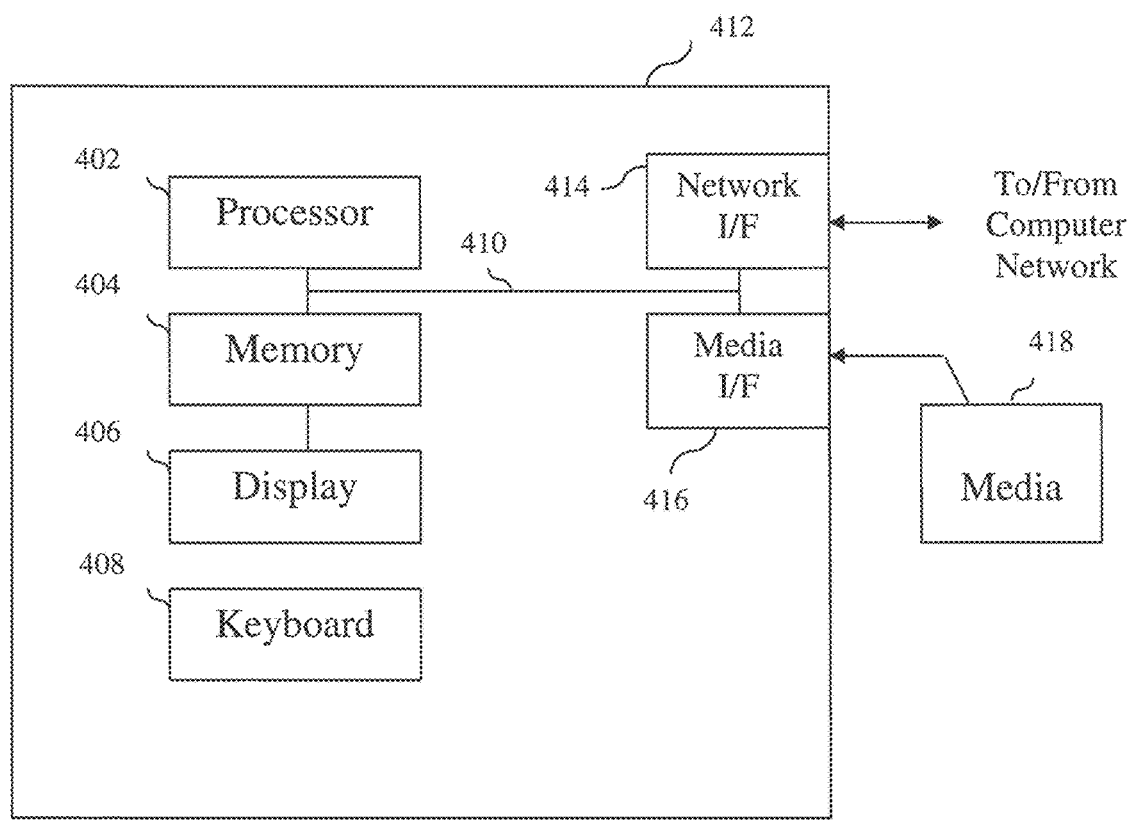
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
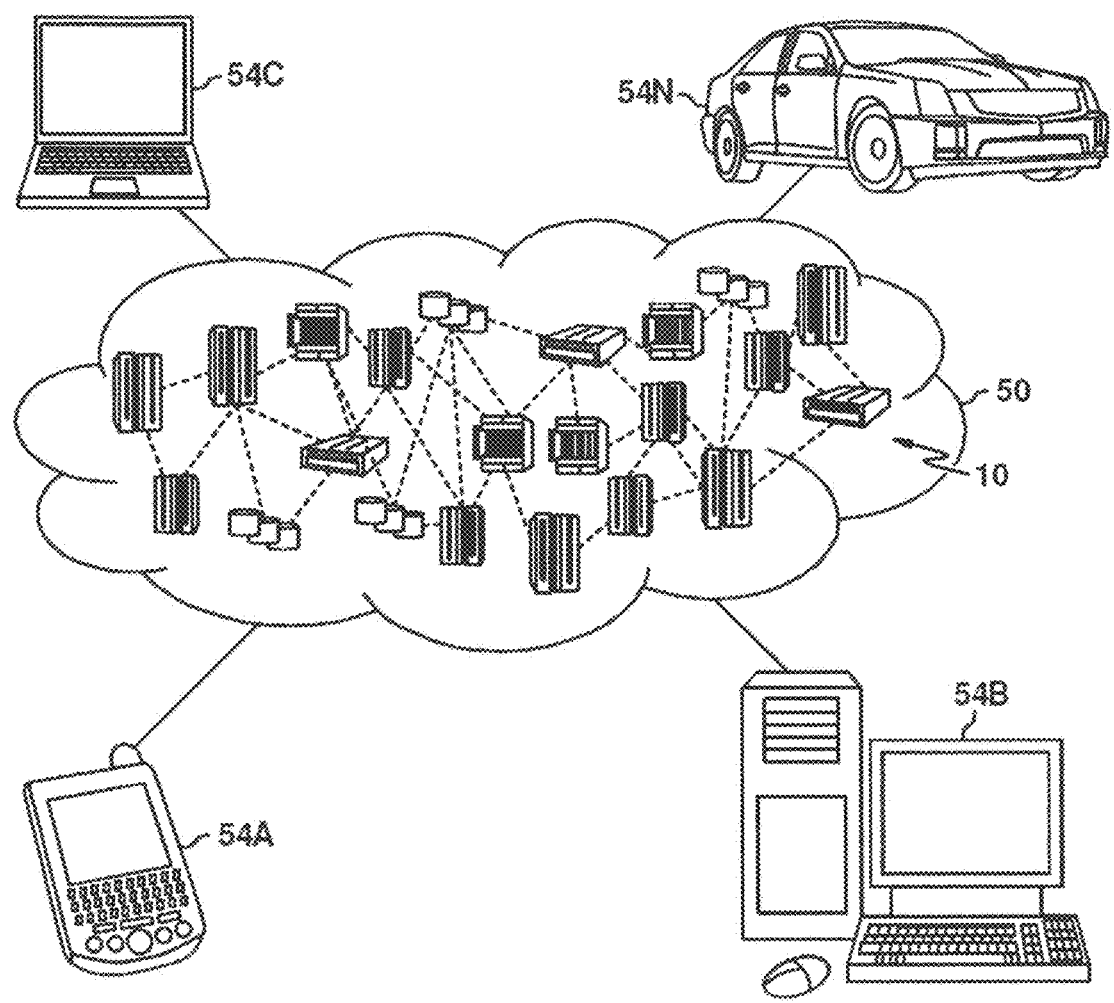
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
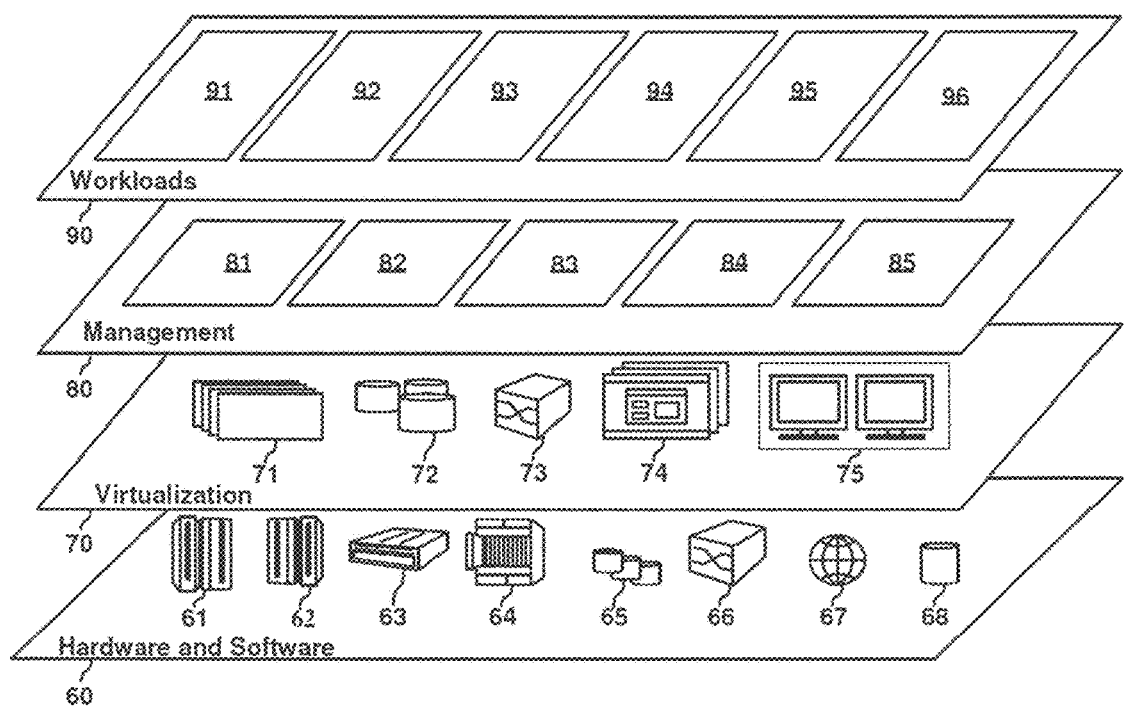
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and activity sensor recommendation generation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, using image data to enrich sensor data, and recommending particular sensor(s) usage for a detected activity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
    identifying, based on (i) sensor data from one or more sensors during a user activity and (ii) video data associated with the user performing the user activity, positioning of the one or more sensors with respect to the user, wherein the one or more sensors are at least one of (a) positioned within a given proximity of a user and (b) worn by the user;
    identifying the user activity being performed based on the video data;
    assessing data quality for the sensor data based on (i) the identified positioning of the one or more sensors and (ii) the identified user activity; and
    generating a recommendation for re-positioning at least one of the one or more sensors based on (i) said assessing and (ii) historical data pertaining to sensor data associated with the identified user activity;
    wherein the steps are carried out by at least one computing device.

2. The computer-implemented method of claim 1, wherein said identifying positioning of the one or more sensors comprises detecting at least one of a shape associated with the one or more sensors, a color associated with the one or more sensors, and a texture associated with the one or more sensors.

3. The computer-implemented method of claim 1, wherein said identifying positioning of the one or more sensors comprises implementing a fiducial marker in connection with the one or more sensors.

4. The computer-implemented method of claim 1, wherein said identifying the user activity comprises utilizing one or more human body models.

5. The computer-implemented method of claim 1, wherein said identifying the user activity comprises statistically decomposing a human body into a hierarchical structure.

6. The computer-implemented method of claim 1, wherein said identifying the user activity comprises computing displacement information from an optical flow field.

7. The computer-implemented method of claim 1, wherein said identifying the user activity comprises implementing an image classifier, generated based on training data, to determine one or more classes of user activities relevant to the sensor data and the video data.

8. The computer-implemented method of claim 1, wherein said assessing comprises determining a noise-to-signal ratio for the sensor data.

9. The computer-implemented method of claim 1, wherein said assessing comprises utilizing a look-up a table containing pre-defined tuples associated with user activities.

10. The computer-implemented method of claim 1, wherein the recommendation comprises combining two or more of the sensors.

11. The computer-implemented method of claim 1, wherein the recommendation further comprises a recommendation of one or more additional user activities.

12. The computer-implemented method of claim 1, comprising:
outputting, to the user, a notification containing the recommendation for re-positioning at least one of the one or more sensors.

13. The computer-implemented method of claim 1, comprising:
updating, based on the recommendation, one or more machine learning algorithms of the one or more sensors, wherein the one or more machine learning algorithms are responsible for estimating motion-related information.

14. The computer-implemented method of claim 1, comprising:
storing the sensor data, the video data, the identified positioning of the one or more sensors, the identified user activity, and the recommendation in a knowledge base.

15. The computer-implemented method of claim 1, comprising:
determining positioning of at least one camera associated with capturing video data.

16. The computer-implemented method of claim 15, wherein said determining positioning of at least one camera comprises inferring a camera view with respect to the user, and utilizing a look-up table containing pre-defined tuples associated with camera views.

17. A computer program product comprising a computer readable storage medium having program instructions embodied therewith, the program instructions executable by a computing device to cause the computing device to:
identify, based on (i) sensor data from one or more sensors during a user activity and (ii) video data associated with the user performing the user activity, positioning of the one or more sensors with respect to the user, wherein the one or more sensors are at least one of (a) positioned within a given proximity of a user and (b) worn by the user;
identify the user activity being performed based on the video data;
assess data quality for the sensor data based on (i) the identified positioning of the one or more sensors and (ii) the identified user activity; and
generate a recommendation for re-positioning at least one of the one or more sensors based on (i) said assessing and (ii) historical data pertaining to sensor data associated with the identified user activity.

18. The computer program product of claim 17, wherein the program instructions executable by a computing device further cause the computing device to:
output, to the user, a notification containing the recommendation for re-positioning at least one of the one or more sensors.

19. A system comprising:
a memory; and
at least one processor operably coupled to the memory and configured for:
identifying, based on (i) sensor data from one or more sensors during a user activity and (ii) video data associated with the user performing the user activity, positioning of the one or more sensors with respect to the user, wherein the one or more sensors are at least one of (a) positioned within a given proximity of a user and (b) worn by the user;
identifying the user activity being performed based on the video data;
assessing data quality for the sensor data based on (i) the identified positioning of the one or more sensors and (ii) the identified user activity; and
generating a recommendation for re-positioning at least one of the one or more sensors based on (i) said assessing and (ii) historical data pertaining to sensor data associated with the identified user activity.

20. The system of claim 19, wherein the at least one processor is further configured for:
outputting, to the user, a notification containing the recommendation for re-positioning at least one of the one or more sensors.

* * * * *